United States Patent
Uchida et al.

(10) Patent No.: US 9,774,017 B2
(45) Date of Patent: Sep. 26, 2017

(54) ELECTRIC DEVICE BODY AND ELECTRIC DEVICE

(71) Applicant: Hitachi Koki Co., Ltd., Tokyo (JP)

(72) Inventors: Hiroki Uchida, Hitachinaka (JP);
Yoshihiro Nakano, Hitachinaka (JP);
Yoshihiro Komuro, Hitachinaka (JP);
Tetsuhiro Harada, Hitachinaka (JP);
Hideyuki Tanimoto, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 49 days.

(21) Appl. No.: 14/760,603

(22) PCT Filed: Jan. 14, 2014

(86) PCT No.: PCT/JP2014/000125
§ 371 (c)(1),
(2) Date: Jul. 13, 2015

(87) PCT Pub. No.: WO2014/125758
PCT Pub. Date: Aug. 21, 2014

(65) Prior Publication Data
US 2015/0357612 A1    Dec. 10, 2015

(30) Foreign Application Priority Data
Feb. 13, 2013    (JP) .................. 2013-025209

(51) Int. Cl.
H01M 10/052    (2010.01)
H01M 2/10    (2006.01)
B25F 5/00    (2006.01)

(52) U.S. Cl.
CPC ............. *H01M 2/1055* (2013.01); *B25F 5/00* (2013.01); *H01M 2220/30* (2013.01)

(58) Field of Classification Search
CPC ..................... H01M 10/052; H01M 10/0525
See application file for complete search history.

(56) References Cited

U.S. PATENT DOCUMENTS 6,376,942 B1    4/2002    Burger et al.
7,243,734 B2    7/2007    Wu
(Continued)

FOREIGN PATENT DOCUMENTS

CN    2762964 Y    3/2006
CN    1954971 A    5/2007
(Continued)

OTHER PUBLICATIONS

Japan Patent Office office actions JPO patent application JP2013-025209 (dated Aug. 2, 2016).
(Continued)

*Primary Examiner* — Olatunji Godo
(74) *Attorney, Agent, or Firm* — Kilpatrick Townsend & Stockton LLP

(57) ABSTRACT

An electric device body in which a battery pack including a plurality of battery cells and a plurality of first terminals is detachably mounted includes: a housing; a guide mechanism; and a plurality of second terminals; and a pressed portion. The battery pack is configured to be attached to and detached from the housing along a first direction. The guide mechanism is provided at the housing and configured to define the first direction. The plurality of second terminals is configured to be connected to the plurality of first terminals upon attachment of the battery pack to the housing. The pressed portion is configured to be pressed against the battery pack in a second direction intersecting the first direction when the battery pack has been attached to the housing.

19 Claims, 7 Drawing Sheets

(56) References Cited

U.S. PATENT DOCUMENTS

| | | | |
|---|---|---|---|
| 7,648,383 | B2 | 1/2010 | Matthias et al. |
| 8,354,183 | B2 | 1/2013 | Konuma et al. |
| 9,263,715 | B2 | 2/2016 | Hamano et al. |
| 2004/0242042 | A1 | 12/2004 | Buck et al. |
| 2006/0091858 | A1 | 5/2006 | Johnson et al. |
| 2008/0124615 | A1 | 5/2008 | Matsumoto |
| 2008/0302552 | A1 | 12/2008 | Kondo |
| 2010/0112435 | A1* | 5/2010 | Hanawa .................. B25F 5/02 429/178 |

FOREIGN PATENT DOCUMENTS

| | | |
|---|---|---|
| CN | 101190523 A | 6/2008 |
| CN | 101318320 | 12/2008 |
| CN | 101511549 A | 8/2009 |
| CN | 101856812 A | 10/2010 |
| CN | 102738422 A | 10/2012 |
| JP | 62-123064 U | 8/1987 |
| JP | 2002-254356 A | 9/2002 |
| JP | 2003-236772 A | 8/2003 |
| JP | 2006-263830 A | 10/2006 |
| JP | 2007-105816 A | 4/2007 |
| JP | 2014-148011 A | 8/2014 |
| JP | 2014-148014 A | 8/2014 |
| WO | WO2005/117232 A2 | 12/2005 |
| WO | WO2008029958 A1 | 3/2008 |

OTHER PUBLICATIONS

International Search Report for application PCT/JP2013/000125 (dated Jun. 17, 2014).

International Search Report for application PCT/JP2014/000125 (dated Jun. 17, 2014).

China Intellectual Property Office office action for application 201480008456.0 dated May 30, 2016.

International Report on Patentability for application PCT/JP2014/000125 (dated Aug. 27, 2015), 8 pages.

China Intellectual Property Office office action for application 201480008456.0 dated Dec. 29, 2016.

\* cited by examiner

[Fig. 1]
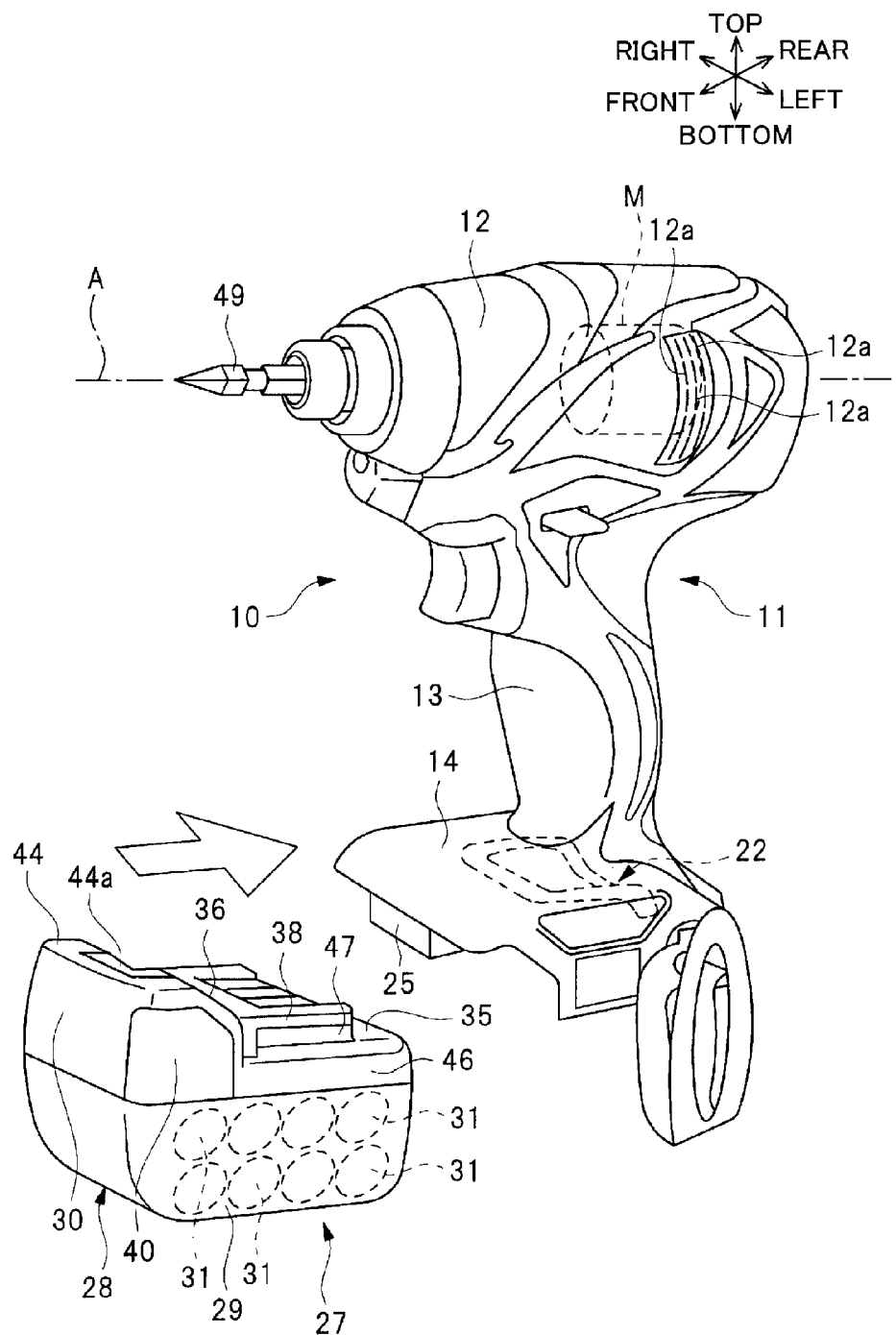

[Fig. 2]
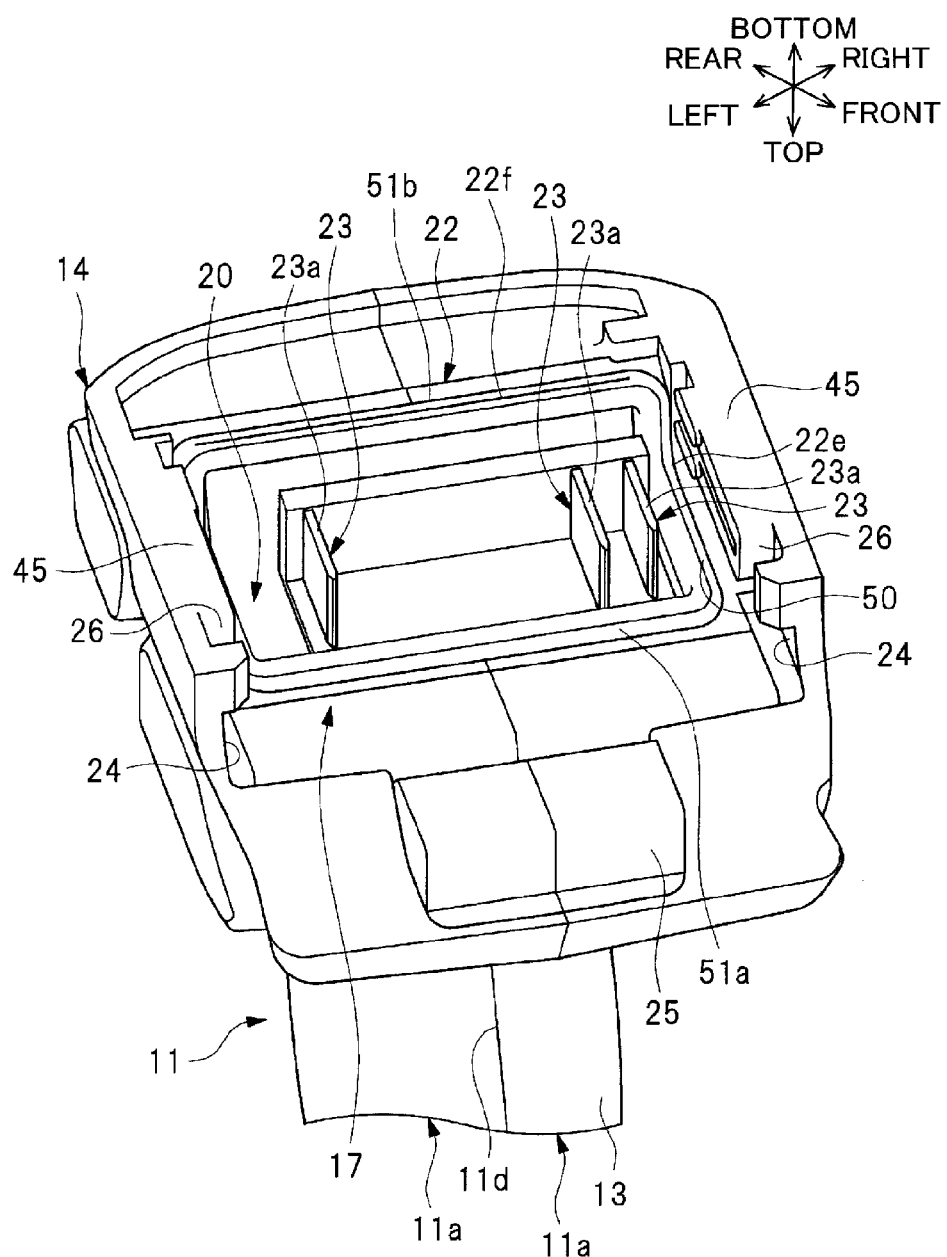

[Fig. 3]
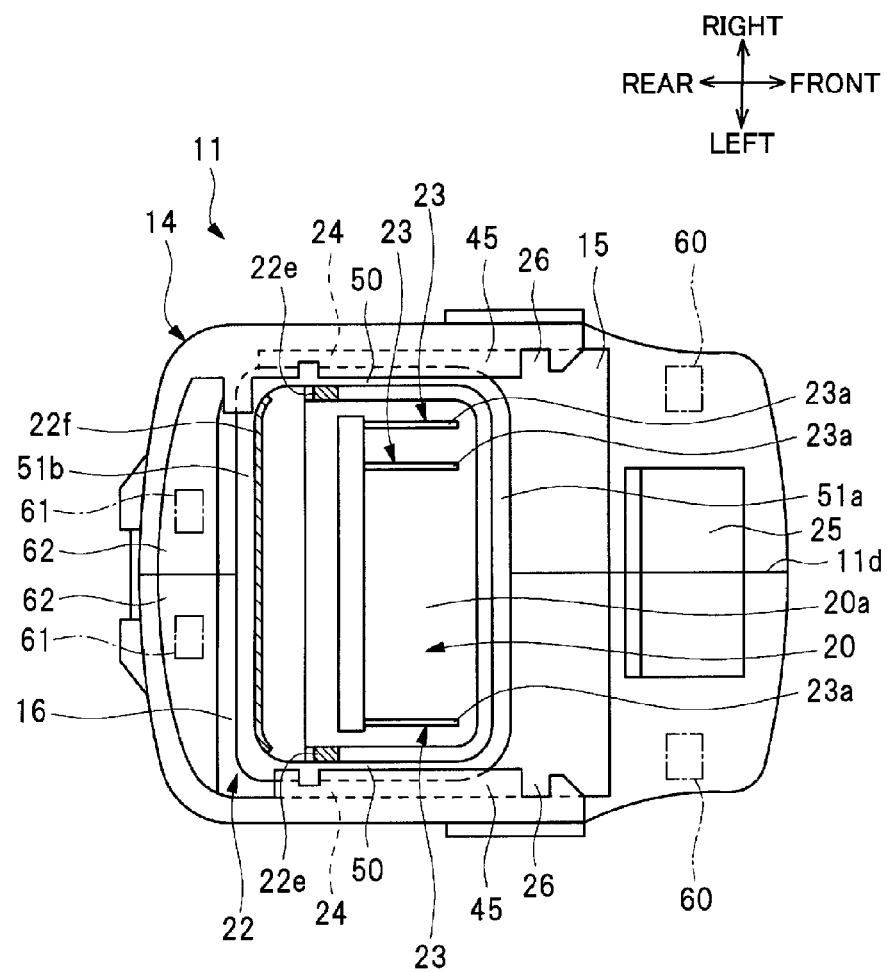

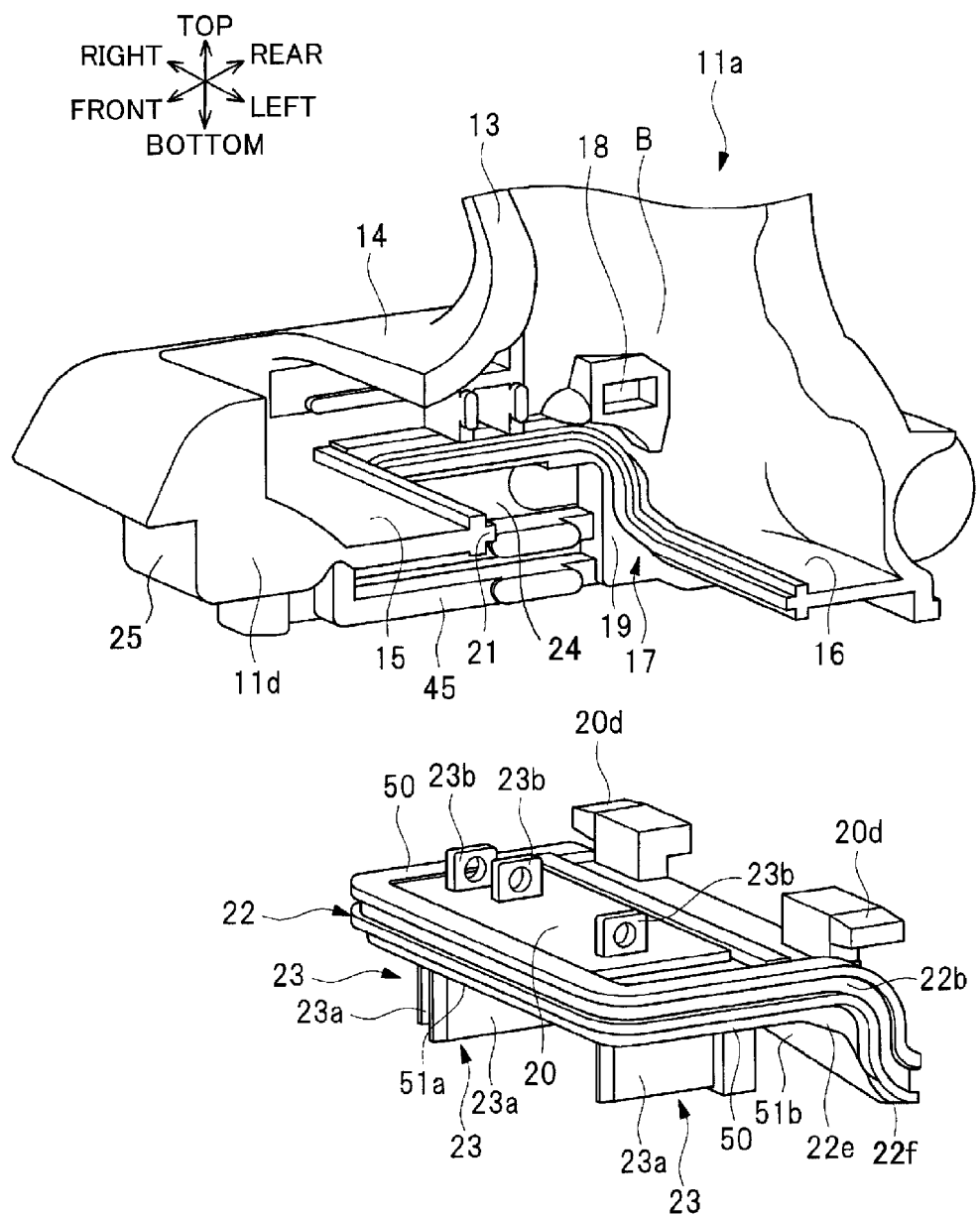

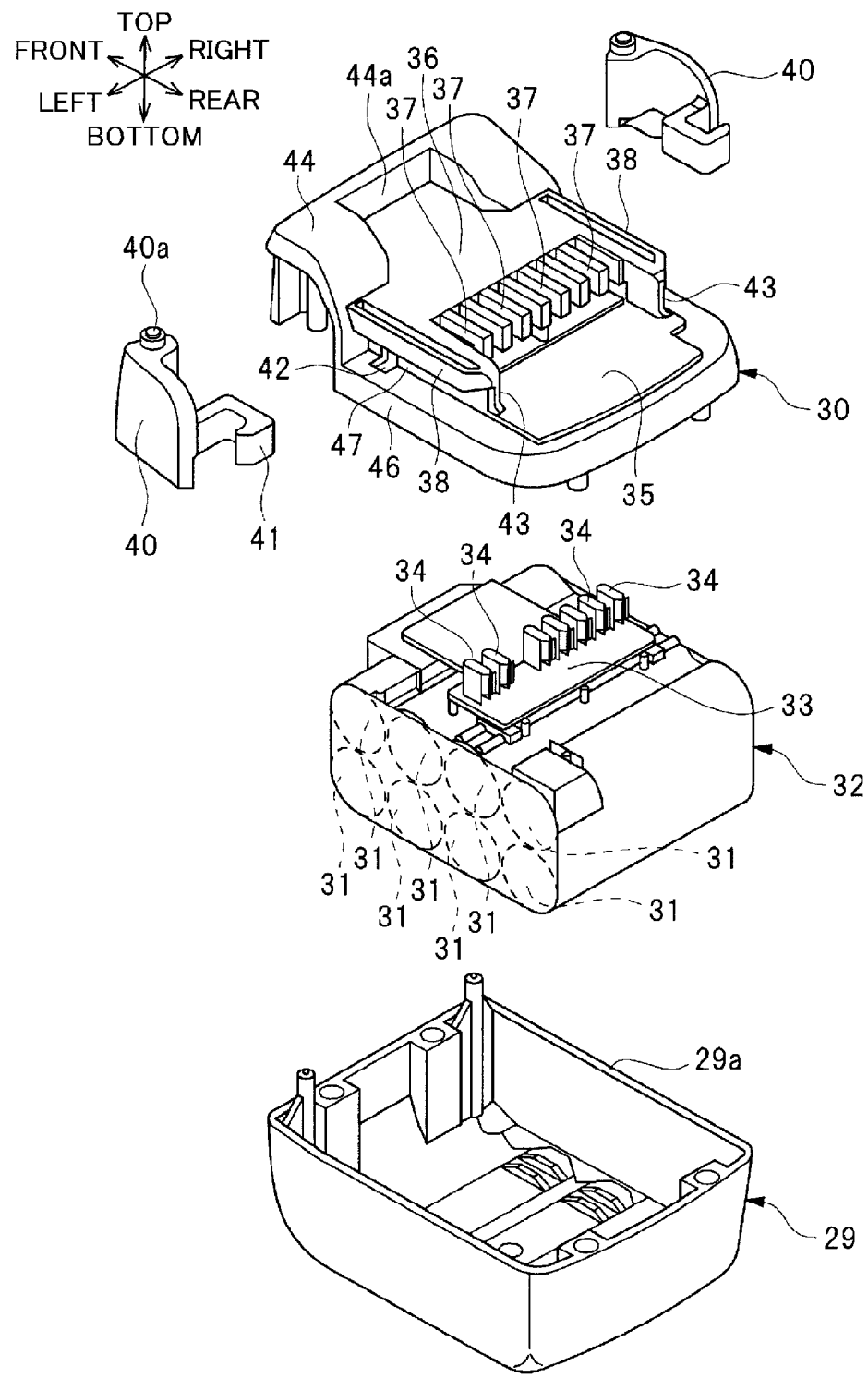
[Fig. 5]

[Fig. 6]
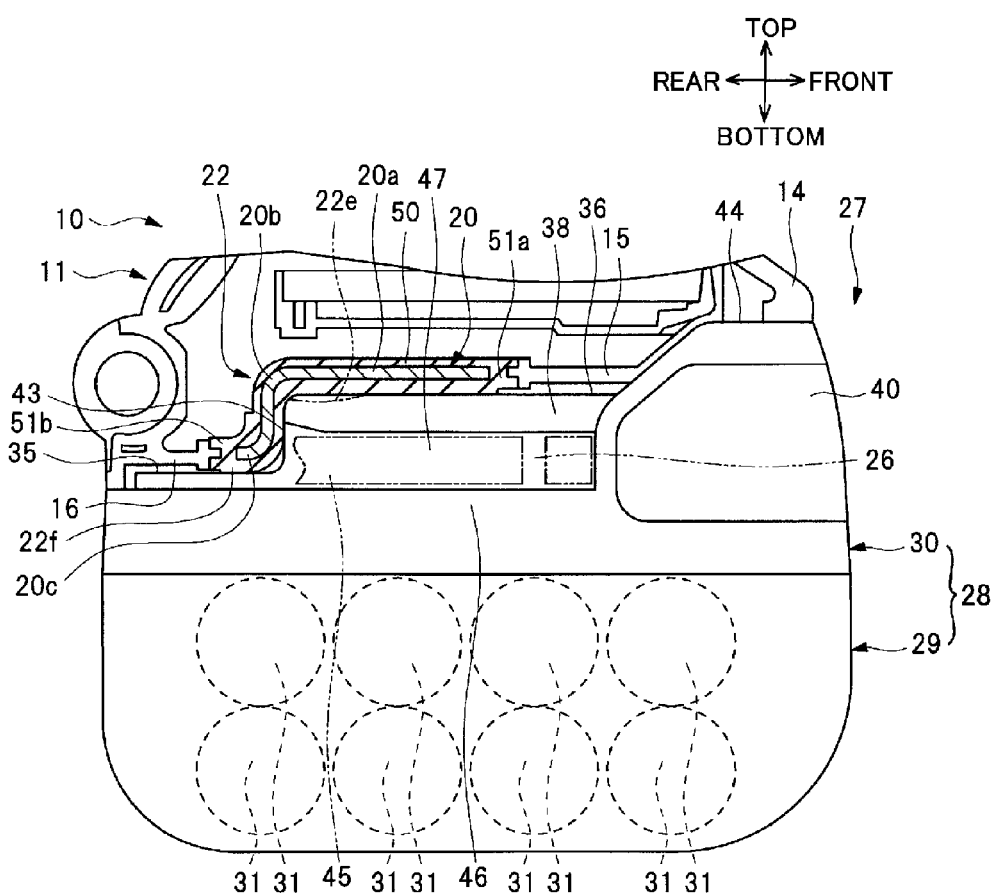

[Fig. 7]
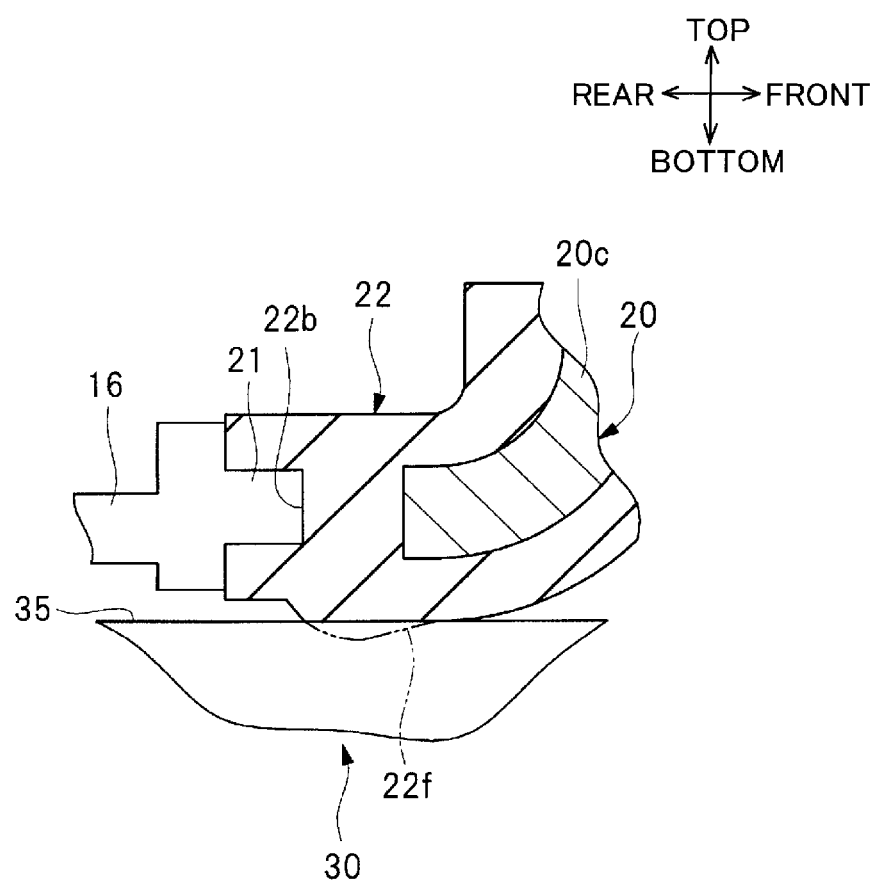

ELECTRIC DEVICE BODY AND ELECTRIC DEVICE

TECHNICAL FIELD

The present invention relates to an electric device body to which a battery pack is detachably mountable, and an electric device configured of the electric device body and the battery pack.

BACKGROUND ART

There is conventionally known an electric device in which a battery pack is attachable to and detachable from a device body. A power tool as an example of such an electric device is disclosed in Japanese Patent Application Publication No. 2002-254356. The power tool includes a device body in which an electric motor is provided. The device body has a grip part, and, within the grip part, a control circuit is provided for controlling the electric motor. The grip part is also provided with a device-side terminal. The device-side terminal is electrically connected to the control circuit.

A battery pack is attachable to and detachable from the grip part. The battery pack accommodates a plurality of battery cells therein. The battery pack is provided with a battery-side terminal. Upon attachment of the battery pack to the grip part, the device-side terminal is connected to the battery-side terminal. Hence, electric power of the battery cells can be supplied to the electric motor.

CITATION LIST

Patent Literature

PTL 1: Japanese Patent Application Publication No. 2002-254356

DISCLOSURE OF INVENTION

Solution to Problem

The device body and the battery pack forms a gap therebetween in a state where the battery pack is attached to the device body. This gap is formed for reducing frictional resistance between the device body and the battery pack while the battery pack is being attached to and detached from the device body. Hence, the gap facilitates the attaching and detaching operations of the battery pack relative to the device body.

However, in a state where the battery pack is attached to the device body, vibration of the device body in operation may cause the device-side terminal to rub against the battery-side terminal due to the gap between the device body and the battery pack.

In view of the foregoing, it is an object of the present invention to provide an electric device body and an electric device capable of preventing device-side terminals from rubbing against battery-side terminals in a state where a battery pack is attached to the electric device body.

In order to attain above and other object, the present invention provides an electric device body in which a battery pack including a plurality of battery cells and a plurality of first terminals is detachably mounted includes: a housing; a guide mechanism; a plurality of second terminals; and a pressed portion. The battery pack is configured to be attached to and detached from the housing along a first direction. The guide mechanism is provided at the housing and configured to define the first direction. The plurality of second terminals is configured to be connected to the plurality of first terminals upon attachment of the battery pack to the housing. The pressed portion is configured to be pressed against the battery pack in a second direction intersecting the first direction when the battery pack has been attached to the housing.

This configuration prevents the battery pack from rattling relative to the housing of the electric device body. Hence, the first terminals are restrained from rubbing against the second terminals while the first terminals and the second terminals are connected to each other. Accordingly, the electric device can reduce the likelihood of damage, deformation and frictional wearing to at least one of the first terminals and the second terminals.

It is preferable that the electric device body further includes: a terminal holder to which the plurality of second terminals is fixed; and a fixing member configured to fix the terminal holder to the housing. The pressed portion is provided at the fixing member.

It is preferable that the pressed portion is provided at the housing and disposed at a position confronting the battery pack when the battery pack has been attached to the housing.

It is preferable that the electric device body further includes: a terminal holder to which the plurality of second terminals is fixed; and a fixing member configured to fix the terminal holder to the housing. The pressed portion includes: a first pressed portion provided at the fixing member; and a second pressed portion provided at the housing and disposed at a position confronting the battery pack.

It is preferable that the housing has a first portion and a second portion along the first direction. The first portion is disposed at a position where the battery pack approaches prior to approaching the second position when the battery pack is attached to the housing. The pressed portion is disposed at a position closer to the second portion than to the first portion.

With this configuration, in the beginning of the operation for attaching the battery pack to the housing of the electric device body, the pressed portion does not contact the battery pack, and accordingly, increase of frictional resistance between the housing of the electric device body and the battery pack can be restrained. On the other hand, in the course of the operation for detaching the battery pack from the housing of the electric device body, increase of frictional resistance between the housing of the electric device body and the battery pack can be restrained after the pressed portion is separated from the battery pack. Consequently, the operability of the electric device body in attaching and detaching the battery pack relative to the housing of the electric device body can be improved.

It is preferable that the pressed portion includes a plurality of pressed portions disposed at positions different from each other along the first direction.

This configuration can reliably prevent the battery pack from pivotally moving relative to the housing of the electric device body about the pressed portion in a state where the battery pack is attached to the housing of the electric device body.

According to another aspect, the present invention provides an electric device including: a battery pack; and an electrical device body in which the battery pack is detachably mounted. The battery pack includes: a plurality of battery cells; and a plurality of first terminals. The electrical device body including: a housing; a guide mechanism; a plurality of second terminals; and a pressed portion. The battery pack is configured to be attached to and detached from the housing along a first direction. The guide mechanism is provided at the housing and configured to define the first direction. The plurality of second terminals is configured to be connected to the plurality of first terminals upon attachment of the battery pack to the housing. The pressed portion is configured to be pressed against the battery pack in a second direction intersecting the first direction when the battery pack has been attached to the housing.

This configuration prevents the battery pack from rattling relative to the housing of the electric device body. Hence, the first terminals are restrained from rubbing against the second terminals while the first terminals and the second terminals are connected to each other. Accordingly, the electric device can reduce the likelihood of damage, deformation and frictional wearing to at least one of the first terminals and the second terminals.

It is preferable that the electric device body further includes: a terminal holder to which the plurality of second terminals is fixed; and a fixing member configured to fix the terminal holder to the housing. The pressed portion is provided at the fixing member.

It is preferable that the pressed portion is provided at the housing and disposed at a position confronting the battery pack when the battery pack has been attached to the housing.

It is preferable that the electric device body further includes: a terminal holder to which the plurality of second terminals is fixed; and a fixing member configured to fix the terminal holder to the housing. The pressed portion includes: a first pressed portion provided at the fixing member; and a second pressed portion provided at the housing and disposed at a position confronting the battery pack.

It is preferable that the housing has a first portion and a second portion along the first direction. The first portion is disposed at a position where the battery pack approaches prior to approaching the second position when the battery pack is attached to the housing. The pressed portion is disposed at a position closer to the second portion than to the first portion.

With this configuration, in the beginning of the operation for attaching the battery pack to the housing of the electric device body, the pressed portion does not contact the battery pack, and accordingly, increase of frictional resistance between the housing of the electric device body and the battery pack can be restrained. On the other hand, in the course of the operation for detaching the battery pack from the housing of the electric device body, increase of frictional resistance between the housing of the electric device body and the battery pack can be restrained after the pressed portion is separated from the battery pack. Consequently, the operability of the electric device in attaching and detaching the battery pack relative to the housing of the electric device body can be improved.

It is preferable that the pressed portion includes a plurality of pressed portions disposed at positions different from each other along the first direction.

This configuration can reliably prevent the battery pack from pivotally moving relative to the housing of the electric device body about the pressed portion in a state where the battery pack is attached to the housing of the electric device body.

Advantageous Effects of Invention

The present invention described above can provide an electric device body and an electric device capable of preventing device-side terminals from rubbing against battery-side terminals in a state where a battery pack is attached to the electric device body.

BRIEF DESCRIPTION OF DRAWINGS

FIG. 1 is a perspective view of a power tool according to one embodiment of the present invention;

FIG. 2 is a perspective view of a mount part of the power tool according to the embodiment as viewed from a bottom side thereof;

FIG. 3 is a bottom plan view of the mount part of the power tool according to the embodiment;

FIG. 4 is an exploded perspective view of the mount part of the power tool according to the embodiment;

FIG. 5 is an exploded perspective view of a battery pack of the power tool according to the embodiment;

FIG. 6 is a partial cross-sectional side view of the power tool according to the embodiment, in which the battery pack is attached to the mount part; and FIG. 7 is an enlarged view of an essential part of the view shown in FIG. 6, in which a rib and a terminal rubber of the mount part are shown.

BEST MODE FOR CARRYING OUT THE INVENTION

A general structure of a power tool as an electric device according to one embodiment of the present invention will be described while referring to FIGS. 1 through 7 wherein like parts and components are designated by the same reference numerals to avoid duplicating description. The power tool 10 shown in FIG. 1 includes a device body 11 according to the embodiment of the present invention, and a battery pack 27. First, a detailed structure of the device body 11 will be described while referring to FIGS. 1 through 4, and 6, and then, a detailed structure of the battery pack 27 will be described while referring to FIGS. 1, 5, and 6.

Directions used in the following description in relation to the power tool 10 including the device body 11 and the battery pack 27 will be based on the perspective of the user. More specifically, as indicated by the direction arrows in FIG. 1, the side of the power tool 10 in which an end bit 49 is provided will be referred to as the "front side", and the opposite side will be referred to as the "rear side". Further, left, right, top, and bottom sides of the power tool 10 will be based on the perspective of the user facing the rear side of the power tool 10.

The power tool 10 shown in FIG. 1 includes the device body 11. The device body 11 includes a housing part 12, a grip part 13, a mount part 14 and a terminal holder 20. A combination of the housing part 12, the grip part 13 and the mount part 14 is an example of a housing. The housing part 12 defines an internal space in which an electric motor M and a power transmission mechanism (not shown) are provided. The electric motor M has a rotation shaft (not shown) extending in a front-rear direction along an axis A and is rotatable about the rotation shaft.

The housing part 12 has a front end at which the end bit 49 is detachably provided. The power transmission mechanism (not shown) is adapted to transmit a drive force generated by the electric motor M to the end bit 49. The end bit 49 rotates about the axis A. Alternatively, the end bit 49 may reciprocatingly move along the axis A. That is, the power tool 10 includes a drill, a driver, a hammer, a hammer drill, a hammer driver, and the like.

The grip part 13 defines an internal space in which a circuit board (not shown) is provided. The circuit board (not shown) is electrically connected to the electric motor M.

The grip part 13 protrudes vertically downward from the housing part 12. The mount part 14 is provided at a protruding end side of the grip part 13. More specifically, the mount part 14 is disposed below the grip part 13. The housing part 12, the grip part 13, and the mount part 14 are integrally made from resin.

As shown in FIGS. 2 and 3, the device body 11 is comprised of two constituent pieces 11a, 11a divided along a dividing surface 11d. The device body 11 is assembled by joining the two constituent pieces 11a, 11a together in a fixed manner. The dividing surface 11d contains the axis A and extends across the housing part 12, the grip part 13, and the mount part 14. Specifically, the two constituent pieces 11a, 11a are left and right pieces. The shape and configuration of the left constituent piece 11a has generally left-right symmetry to the shape and configuration of the right constituent piece 11a. That is, the shape and configuration of each of the housing part 12, the grip part 13, and the mount part 14 has generally left-right symmetry along the dividing surface 11d.

The housing part 12 is formed with a plurality of ventilation holes 12a (FIG. 1) for providing communication between the interior and exterior of the housing part 12.

As shown in FIG. 4, the mount part 14 has a first partitioning wall 15 and a second partitioning wall 16. The first partitioning wall 15 and the second partitioning wall 16 extend in a direction substantially perpendicular to the dividing surface 11d. Further, the first partitioning wall 15 and the second partitioning wall 16 extend in a direction substantially parallel to the axis A. More specifically, the first partitioning wall 15 and the second partitioning wall 16 extend in the front-rear direction.

The internal space defined by the grip part 13 and an internal space defined by the mount part 14 form a space B. The mount part 14 is formed with an opening 17 at a position opposite to the space B with respect to the first partitioning wall 15 and the second partitioning wall 16.

The first partitioning wall 15 is disposed forward of the second partitioning wall 16 in a direction along the axis A (i.e., front-rear direction). Further, the first partitioning wall 15 is provided at a position different from the second partitioning wall 16 in a protruding direction of the grip part 13 from the housing part 12 (i.e., vertical direction). More specifically, the first partitioning wall 15 is provided at a position closer to the grip part 13 than the second partitioning wall 16 to the grip part 13. In other words, the first partitioning wall 15 is disposed vertically upward of the second partitioning wall 16. The first partitioning wall 15 is comprised from the joining of the two constituent pieces 11a, 11a. Likewise, the second partitioning wall 16 is comprised from the joining of the two constituent pieces 11a, 11a.

The space B communicates with the internal space defined by the housing part 12.

The mount part 14 is formed with a pair of engagement recessed parts 18, 18. One of the two engagement recessed parts 18 is disposed at each of the two constituent pieces 11a, 11a.

The mount part 14 is formed with an attachment hole 19 at a position between the first partitioning wall 15 and the second partitioning wall 16. The attachment hole 19 is defined by the joining of the two constituent pieces 11a, 11a. More specifically, a rear edge of the first partitioning wall 15, a front edge of the second partitioning wall 16, a right edge of a left side partitioning wall (not shown) of the mount part 14, and a left edge of a right side partitioning wall (shown without a reference sign) of the mount part 14 defines the attachment hole 19. The attachment hole 19 is formed for attaching the terminal holder 20 (described later) to these partitioning walls.

A rib 21 is formed on the rear edge of the first partitioning wall 15, the front edge of the second partitioning wall 16, the right edge of a left side partitioning wall (not shown) of the mount part 14, and the left edge of a right side partitioning wall (shown without a reference sign) of the mount part 14. That is, the rib 21 is formed along the edges of the partitioning walls defining the attachment hole 19 and surrounds the attachment hole 19 having a generally square shape in a plan view. The rib 21 is comprised from the joining of the two constituent pieces 11a, 11a. The terminal holder 20 is supported to the mount part 14 through the rib 21.

The terminal holder 20 is made from resin. As shown in FIG. 6, the terminal holder 20 integrally includes a flat plate portion 20a, a curved portion 20b, and a connection portion 20c. The flat plate portion 20a is formed in a generally rectangular shape in a plan view. The connection portion 20c is connected to a major side of the flat plate portion 20a via the curved portion 20b. The major side of the flat plate portion 20a extends along the front edge of the second partitioning wall 16 in a plan view. Further, the major side of the flat plate portion 20a at which the curved portion 20b is formed is closer to the second partitioning wall 16 than another major side of the flat plate portion 20a to the second partitioning wall 16. Specifically, the curved portion 20b is provided at the rear major side of the flat plate portion 20a.

As shown in FIGS. 3 and 4, a terminal rubber 22 is attached to the terminal holder 20 along an outer circumference thereof. The terminal rubber 22 is generally hollow-square shaped in a plan view. The terminal rubber 22 is a single member formed of a rubber like elastic material. The terminal rubber 22 includes a pair of left and right first sealing portions 50, a second sealing portion 51a, and a third sealing portion 51b. The left first sealing portion 50 and the right first sealing portion 50 extend in the front-rear direction and are arranged parallel to each other. The second sealing portion 51a bridges front edges of the first sealing portions 50 and extends along the rear edge of the first partitioning wall 15. The third sealing portion 51b bridges rear edges of the first sealing portions 50 and extends along the front edge of the second partitioning wall 16. The second sealing portion 51a and the third sealing portion 51b extend in the left-right direction and are arranged parallel to each other. The terminal rubber 22 is an example of a fixing member and also an example of a sealing member.

The terminal rubber 22 has an outer circumference formed with an outer groove 22b. The outer groove 22b has a generally U-shaped cross-section. More specifically, the outer groove 22b is recessed inward into the outer circumferential surface of the terminal rubber 22. By fitting the rib 21 into the outer groove 22b of the terminal rubber 22, the terminal rubber 22 is fixed to the mount part 14. Hence, the terminal holder 20 is fixed to the mount part 14 such that the terminal rubber 22 is interposed between a left part of the rib 21 formed in the left constituent piece 11a and a right part of the rib 21 formed in the right constituent piece 11a.

Further, the terminal holder 20 includes a pair of engagement projecting parts 20d, 20d. Each engagement projecting part 20d is insertable into the corresponding engagement recessed part 18 of the mount part 14. The terminal holder 20 is reliably fixed to the mount part 14 and subjected to positioning relative to the mount part 14 by the engagement projecting parts 20*d* inserted into the corresponding engagement recessed parts 18.

The terminal rubber 22 with the above-described configuration is interposed between the terminal holder 20 and the mount part 14. Hence, the terminal rubber 22 seals a gap between the mount part 14 and the terminal holder 20.

As shown in FIGS. 3 and 4, a plurality of device-side terminals 23 is provided at the terminal holder 20. Each of the plurality of device-side terminals 23 is made of metal and has electrically conductive properties. In a state where the terminal holder 20 is fixed to the mount part 14, lower end portions 23*a* of the device-side terminals 23 are located in the opening 17 while upper end portions 23*b* of the device-side terminals 23 are located in the space B. The upper end portions 23*b* of the device-side terminals 23 are electrically connected to the circuit board (not shown) provided in the grip part 13. The lower end portions 23*a* of the device-side terminals 23 have a plate shape and extend parallel to the dividing surface 11*d* dividing the device body 11 into the two constituent pieces 11*a*, 11*a*. The terminal rubber 22 serves as a fixing member for restraining relative movement between the plurality of device-side terminals 23 and the mount part 14.

Next, a detailed structure of the battery pack 27 will be described. As shown in FIG. 1, the battery pack 27 is attachable to and detachable from the mount part 14 of the device body 11. More specifically, the battery pack 27 is moved relative to the device body 11 along a direction in which the axis A extends (i.e., along the front-rear direction), thereby attaching to and detaching from the mount part 14.

As shown in FIGS. 5 and 6, the battery pack 27 includes a casing 28. The casing 28 has a base part 29 and a cover part 30. The base part 29 has a generally box-like shape with an opening 29*a* on top. The cover part 30 covers the opening 29*a*. The base part 29 defines an internal space in which a plurality of battery cells 31 is accommodated. The plurality of battery cells 31 is retained in a holder 32 made from resin. As the battery cell 31, a lithium ion battery cell, a nickel-cadmium battery cell, a nickel metal hydride battery cell, and the like are available. A circuit board 33 is attached to the holder 32. The circuit board 33 is electrically connected to electrodes of the battery cells 31. The circuit board 33 is provided with a plurality of battery-side terminals 34. The plurality of battery-side terminals 34 is made from electrically conductive metal material.

The cover part 30 includes a base portion 46, a planar portion 35 provided at the base portion 46, and a mount portion 36 provided at a height different from the planar portion 35. That is, the mount portion 36 is disposed higher than the planar portion 35. The mount portion 36 protrudes from the base portion 46. The mount portion 36 is formed with a plurality of terminal insertion holes 37. The plurality of terminal insertion holes 37 is slit-like shaped, and provides communication between the interior and exterior of the casing 28. The plurality of terminal insertion holes 37 extends in the front-rear direction, and, in a plan view, arranged parallel to each other. The battery-side terminals 34 are inserted into the terminal insertion holes 37, respectively.

The cover part 30 has a pair of left and right connecting surfaces 43, each connecting a top surface of the mount portion 36 to a top surface of the planar portion 35. The pair of connecting surfaces 43 is provided at a height different from the top surface of the mount portion 36 or the top surface of the planar portion 35. The left connecting surface 43 and the right connecting surface 43 extend vertically and are arranged parallel to each other. Further, the two connecting surfaces 43 are disposed substantially perpendicular to the top surface of the planar portion 35 and to the top surface of the mount portion 36. The plurality of terminal insertion holes 37 opens from the top surface of the mount portion 36 toward the pair of connecting surfaces 43. The cover part 30 further includes a protruding portion 44. The protruding portion 44 is disposed on the opposite side of the planar portion 35 in the front-rear direction. Specifically, the protruding portion 44 is disposed at a front end of the cover part 30. The protruding portion 44 is disposed higher than the mount portion 36. The protruding portion 44 is formed with a concave portion 44*a*.

A pair of left and right push-buttons 40 is provided at the cover part 30. The two push-buttons 40 are disposed one each on the left and right sides of the protruding portion 44. Each push-button 40 has a support shaft 40*a*, and is supported to the cover part 30 so as to be pivotally movable about the support shaft 40*a* within a range of prescribed angles. Each push-button 40 also has an engagement claw 41. The engagement claw 41 is inserted into a hole 42 formed in the cover part 30, but a distal end of the engagement claw 41 is exposed to the outside through the hole 42. Incidentally, the push-button 40 is urged by a resilient member (not shown) toward the outer left-right side of the cover part 30.

Next, a guide mechanism will be described in detail. The guide mechanism serves to guide relative movement between the battery pack 27 and the mount part 14 along a predetermined direction (i.e., front-rear direction). More specifically, the guide mechanism is adapted to guide the battery pack 27 and the mount part 14 to be linearly moved relative to each other so that the plurality of battery-side terminals 34 is reliably connected to the plurality of device-side terminals 23 when the battery pack 27 is attached to the mount part 14 of the device body 11.

As shown in FIGS. 2 and 3, the mount part 14 is provided with a pair of left and right guide rails 45. The two guide rails 45 are disposed one each on the left and right sides of the opening 17. Further, the mount part 14 is formed with a pair of left and right guide grooves 24. The two guide grooves 24 are defined one each by the guide rails 45 and the left-right partitioning walls (not shown). More specifically, the left guide groove 24 is defined by the left guide rail 45 and the left side partitioning wall (not shown), and disposed between the left guide rail 45 and the opening 17, while the right guide groove 24 is defined by the right guide rail 45 and the right side partitioning wall (shown in FIG. 4 without reference signs), and disposed between the right guide rail 45 and the opening 17. Incidentally, one of the two guide rails 45 and one of the two guide grooves 24 are provided at each of the two constituent pieces 11*a*, 11*a*.

As shown in FIG. 3, the pair of guide rails 45 extends in the front-rear direction and is arranged parallel to each other. The pair of guide grooves 24 also extends in the front-rear direction and is arranged parallel to each other. Further, each guide rail 45 is parallel to each guide groove 24. Further, each guide rail 45 and each guide grooves 24 extends linearly and parallel to the lower end portion 23*a* of each device-side terminal 23.

The mount part 14 is also provided with a convex portion 25. The convex portion 25 is comprised from the joining of the two constituent pieces 11*a*, 11*a*.

As shown in FIGS. 2 and 3, each guide rail 45 is formed with an engagement groove 26.

As shown in FIG. 3, each guide rail 45 and each guide groove 24 extend in a direction that each first sealing portion 50 extends. In other words, each guide rail 45 and each guide groove 24 extend in a direction intersecting a direction that the second sealing portion 51a and the third sealing portion 51b extend. More specifically, in a bottom plan view (see FIG. 3), each guide rail 45 and each guide groove 24 extend in a direction perpendicular to the direction that the second sealing portion 51a and the third sealing portion 51b extend.

The mount portion 36 of the cover part 30 is provided with a pair of left and right guide rails 38. The two guide rails 38 are disposed one each on the left and right sides of the terminal insertion holes 37. The pair of guide rails 38 extends in the front-rear direction and is arranged parallel to each other. Each guide rail 38 extends in a direction that the plurality of terminal insertion holes 37 extends.

The cover part 30 is formed with a pair of left and right guide grooves 47. The two guide grooves 47 are defined one each by the guide rails 38 and the base portion 46. More specifically, the left guide groove 47 is defined by the left guide rail 38 and the base portion 46, while the right guide groove 47 is defined by the right guide rail 38 and the base portion 46. The pair of guide grooves 47 extends in the front-rear direction and is arranged parallel to each other. Each guide groove 47 is parallel to each guide rail 38. The pair of guide rails 38 and the pair of guide grooves 47 extends linearly along the extending direction of the plurality of terminal insertion holes 37.

Incidentally, the guide mechanism is constituted by the pair of guide rails 45 and the pair of guide grooves 24 both provided at the mount part 14, and the pair of guide rails 38 and the pair of guide grooves 47 both provided at the cover part 30.

Next, an operation for attaching the battery pack 27 to the mount part 14 of the device body 11 will be described in detail.

In order to attach the battery pack 27 to the mount part 14, a user arranges the device body 11 and the battery pack 27 such that the pair of guide grooves 24 of the mount part 14 and the pair of guide rails 38 of the battery pack 27 are parallel to each other. At this time, the device body 11 and the battery pack 27 are placed in a state shown in FIG. 1. Then, the user moves the battery pack 27 toward the mount part 14 of the device body 11 along the extending direction of the axis A, and slides the guide rails 38 into the corresponding guide grooves 24 while sliding the guide rails 45 into the corresponding guide grooves 47. As a result, the guide rails 38 are brought into contact with the corresponding guide rails 45. Hence, substantially linear movement of the battery pack 27 relative to the mount part 14 of the device body 11 can be achieved.

As the user continues to move the battery pack 27, the battery-side terminals 34 are connected to the plurality of device-side terminals 23 since the device-side terminals 23 are inserted into the corresponding terminal insertion holes 37. The guide rails 38, 45 and the guide grooves 24, 27 serve as the guide mechanism for reliably connecting the device-side terminals 23 to the battery-side terminals 34.

As the user further moves the battery pack 27 into the mount part 14, the convex portion 25 is inserted into the concave portion 44a, and the engagement claws 41 are fitted into the corresponding engagement grooves 26.

Incidentally, when the battery pack 27 is attached to the mount part 14, the second sealing portion 51a approaches the battery pack 27 before the third sealing portion 51b approaches the battery pack 27. That is, after the second sealing portion 51a confronts the top surface of the mount portion 36, the third sealing portion 51b confronts the top surface of the planar portion 35.

Through this operation, attachment of the battery pack 27 to the mount part 14 is completed.

In order to detach the battery pack 27 from the mount part 14, the user pushes the push-buttons 40 of the battery pack 27 that has been attached to the mount part 14, whereby the engagement claws 41 are disengaged from the corresponding engagement grooves 26. Subsequently, the user moves the battery pack 27 away from the mount part 14 of the device body 11 along the extending direction of the axis A. At this time, the battery pack 27 is moved relative to the mount part 14 in a direction opposite to the attaching direction of the battery pack 27 to the mount part 14. As a result, the battery pack 27 is linearly moved relative to the mount part 14 by the guide rails 38, 45 and the guide grooves 24, 47. Through this operation, the battery pack 27 can be detached from the mount part 14.

In the meantime, gaps are formed between the guide rails 38 and the corresponding guide rails 45 in a state where the battery pack 27 is attached to the mount part 14. More specifically, as shown in FIG. 6, the gap is formed between the guide rail 38 and the guide rail 45 in a direction intersecting the extending direction of the guide rail 38 and the guide rail 45, that is, in the vertical direction. The gaps in the vertical direction serve to reduce frictional resistance caused by sliding-contact between the guide rails 38 and the corresponding guide rails 45 while the battery pack 27 is being attached to and detached from the mount part 14. Accordingly, the gaps can reduce operational force required for the operations attaching and detaching the battery pack 27 relative to the mount part 14.

However, due to the vertical gaps between the guide rails 38 and the corresponding guide rails 45, the battery pack 27 is vertically movable relative to the mount part 14 in a state where the battery pack 27 is attached to the mount part 14, with the result that the battery-side terminals 34 rub against the device-side terminals 23. This may raise likelihood of damage, deformation and frictional wearing to at least one of the device-side terminals 23 and the battery-side terminals 34.

The device body 11 according to the present embodiment has a structure to solve this problem. Specifically, as shown in FIG. 3, each first sealing portion 50 of the terminal rubber 22 is provided with a projecting portion 22e at a position close to the third sealing portion 51b. As indicated by a double-dashed line in FIG. 6, each projecting portion 22e projects downward, that is, in a thickness direction of the flat plate portion 20a, when the battery pack 27 has been detached from the mount part 14.

Further, as shown in FIG. 3, the third sealing portion 51b of the terminal rubber 22 is provided with a projecting portion 22f extending along the third sealing portion 51b. In a bottom plan view, the projecting portion 22f extends in a direction perpendicular to the extending direction of the guide grooves 24 (i.e., left-right direction). In a state where the battery pack 27 is detached from the mount part 14, as indicated by a double-dashed line in FIG. 7, the projecting portion 22f projects downward, that is, in a thickness direction of the second partitioning wall 16. As shown in FIG. 3, in a bottom plan view, the projecting portion 22f is disposed at a position different from the projecting portions 22e in the extending direction of the guide rails 45 (i.e., front-rear direction). In other words, the projecting portion 22f is provided at a position different from the projecting portions 22e in the attaching direction of the battery pack 27 to the mount part 14.

In a state where the battery pack 27 is attached to the mount part 14, the projecting portions 22e of the terminal rubber 22 are in pressure-contact with the mount portion 36. More specifically, when the projecting portions 22*e* are in contact with the mount portion 36, the projecting portions 22*e* are elastically deformed, and pressed against the top surface of the mount portion 36 with an elastic restoring force of the projecting portions 22*e*. Further, in a state where the battery pack 27 is attached to the mount part 14, the projecting portion 22*f* of the terminal rubber 22 is in pressure-contact with the planar portion 35. More specifically, when the projecting portion 22*f* is in contact with the planar portion 35, the projecting portion 22*f* is elastically deformed, and pressed against the top surface of the planar portion 35 with an elastic restoring force of the projecting portion 22*f*. The projecting portions 22*e* and the projecting portion 22*f* is an example of a pressed portion.

Since the projecting portions 22*e* and the projecting portion 22*f* are pressed against the top surface of the cover part 30, the vertical gaps formed between the guide rails 38 and the corresponding guide rails 45 are cleared. Hence, even when the electric motor M is rotated to cause vibration of the power tool 10, this configuration can prevent the battery pack 27 from rattling relative to the mount part 14. More specifically, the projecting portions 22*e* and the projecting portion 22*f* prevent the battery-side terminals 34 from rubbing against the device-side terminals 23 while the device-side terminals 23 and the battery-side terminals 34 are in contact with each other. Accordingly, the power tool 10 according to the above-described embodiment reduces the likelihood of damage, deformation and frictional wearing to at least one of the device-side terminals 23 and the battery-side terminals 34.

Further, the projecting portions 22*e* and the projecting portion 22*f* are disposed closer to the third sealing portion 51*b* than to the second sealing portion 51*a*. When the battery pack 27 is attached to the mount part 14, the leading end of the battery pack 27 approaches the third sealing portion 51*b* after the leading end of the battery pack 27 moves past the second sealing portion 51*a*. Therefore, in the beginning of the operation for attaching the battery pack 27 to the mount part 14, the projecting portions 22*e* and the projecting portion 22*f* (the terminal rubber 22) does not contact the cover part 30. Accordingly, increase of frictional resistance between the terminal rubber 22 and the cover part 30 can be restrained. At the time when the projecting portions 22*e* and the projecting portion 22*f* are brought into contact with the cover part 30 in the course of the operation for attaching the battery pack 27 to the mount part 14, frictional resistance between the terminal rubber 22 and the cover part 30 starts increasing. Accordingly, the power tool 10 according to the above-described embodiment improves the operability in attaching the battery pack 27 to the mount part 14.

On the other hand, in the beginning of the operation for detaching the battery pack 27 from the mount part 14, frictional resistance between the terminal rubber 22 and the cover part 30 increases since the projecting portions 22*e* and the projecting portion 22*f* are in pressure-contact with the cover part 30. However, after the projecting portions 22*e* and the projecting portion 22*f* (the terminal rubber 22) is separated from the cover part 30 in the course of the operation for detaching the battery pack 27 from the mount part 14, increase of frictional resistance between the terminal rubber 22 and the cover part 30 can be restrained. Accordingly, the power tool 10 according to the above-described embodiment improves the operability in detaching the battery pack 27 from the mount part 14.

Further, in a bottom plan view, the projecting portions 22*e* are disposed at positions different from the projecting portion 22*f* in the extending direction of the guide rails 45. In other words, as viewed in the vertical direction, three projecting portions of the terminal rubber 22 (the two projecting portions 22*e* and the one projecting portion 220 contacts the cover part 30 when the battery pack 27 has been attached to the mount part 14. In a case where only one projecting portion of the terminal rubber 22 contacts the cover part 30 in a state where the battery pack 27 is attached to the mount part 14, the battery pack 27 is likely to pivotally move relative to the mount part 14 about the one projecting portion. Compared to this case, the power tool 10 according to the above-described embodiment can efficiently prevent the battery pack 27 from pivotally moving relative to the mount part 14 about the projecting portions 22*e* and the projecting portion 22*f* in a state where the battery pack 27 is attached to the mount part 14.

Further, the projecting portions 22*e* and the projecting portion 22*f* are provided integrally with the terminal rubber 22. The terminal holder 20 is attached to the mount part 14 through the rib 21 fitted in the outer groove 22*b* of the terminal rubber 22. That is, the terminal rubber 22 contacts all of the mount part 14, the terminal holder 20, and the cover part 30. Accordingly, the terminal rubber 22 solely can restrain relative movement between the mount part 14, the terminal holder 20, and the cover part 30.

Various modifications are conceivable.

In place of the projecting portions 22*e* and the projecting portion 22*f*, a pair of left and right first elastic members 60 and a pair of left and right second elastic members 61 are available for the pressed portion, as indicated by dashed lines in FIG. 3. The first elastic members 60 and the second elastic members 61 are provided at the mount part 14 at positions confronting the cover part 30 of the battery pack 27.

More specifically, the two first elastic members 60 are fixedly provided at the mount part 14 at positions one on each of the left and right sides of the convex portion 25. In other words, one of the first elastic members 60 is disposed at each of the two constituent pieces 11*a*, 11*a*. The two first elastic members 60 are arranged spaced apart from each other in the extending direction of the second sealing portion 51*a* (i.e., left-right direction).

The mount part 14 has a flat surface 62 at its rear portion. The flat surface 62 is comprised from the joining of the two constituent pieces 11*a*, 11*a*. The two second elastic members 61 are fixedly provided at the flat surface 62. In other words, one of the second elastic members 61 is disposed at each of the two constituent pieces 11*a*, 11*a*. The two second elastic members 61 are arranged spaced apart from each other in the extending direction of the third sealing portion 51*b* (i.e., left-right direction).

The first elastic members 60 are disposed at a front portion of the mount part 14 that first approaches the battery pack 27 when the battery pack 27 is attached to the mount part 14, while the second elastic members 61 are disposed at rear portion of the mount part 14 that approaches the battery pack 27 after the front portion of the mount part 14 moves past the leading portion (i.e. rear portion) of the battery pack 27. In other words, the first elastic members 60 are provided at positions different from the second elastic members 61 in the attaching direction of the battery pack 27 to the mount part 14 (i.e., front-rear direction).

The first elastic members 60 and the second elastic members 61 are made from rubber or silicon, for example. The first elastic members 60 have a cylindrical shape with their axes aligned in the extending direction of the second sealing portion 51*a* (i.e., left-right direction). The second elastic members 61 also have a cylindrical shape with their axes aligned in the extending direction of the second sealing portion 51a (i.e., left-right direction).

The mount part 14 is formed with a plurality of grooves into which the first elastic members 60 and the second elastic members 61 are respectively fitted. Bottom edges of outer peripheral surfaces of the first and second elastic members 60, 61 protrude from the bottom surface of the mount part 14. The first elastic members 60 and the second elastic members 61 are provided separately from the terminal rubber 22. Hence, the first elastic members 60 or the second elastic members 61 do not have a function to seal the gap between the mount part 14 and the terminal holder 20.

When the battery pack 27 has been attached to the mount part 14 in which the first elastic members 60 and the second elastic members 61 are provided, the first elastic members 60 are pressed against the top surface of the mount portion 36, and the second elastic members 61 are pressed against the top surface of the planar portion 35. Hence, the first elastic members 60 and the second elastic members 61 can restrain the battery pack 27 from moving relative to the mount part 14. Accordingly, the above-described modification can also obtain the same operational advantages described in the above-described embodiment.

Incidentally, the device body 11 is provided with at least one of a set of the projecting portions 22e and the projecting portion 22f, and a set of the first elastic members 60 and the second elastic members 61. In a case where the device body 11 is provided with both of the set of the projecting portions 22e and the projecting portion 22f, and the set of the first elastic members 60 and the second elastic members 61, the set of the projecting portions 22e and the projecting portion 22f is an example of a first pressed portion, and the set of the first elastic members 60 and the second elastic members 61 is an example of a second pressed portion.

The present invention is not only available for the power tool but also available for the following tool: a grinder (grinding tool), a sander (sanding machine), a nail gun, a screw driver, a tacker (staple gun), a dust extractor (cleaner), a fan, a blower, a pump, a high pressure washer, a chain saw (cutter), a gardening tool (grass trimmer, hedge trimmer), a tiller, and the like. In other words, the electric device of the present invention includes any device in which an electric motor is rotated on electricity generated by a battery pack, and rotation of the electric motor is converted to at least one of rotating movement and reciprocating movement of a movable member. Further, the present invention is also available for an electric torch. In other words, the electric device of the present invention further includes a lighting device in which electric energy supplied from the battery pack is converted to optical energy.

Further, the casing 28 may have a configuration accommodating more than nine battery cells therein. The casing 28 may also have a configuration accommodating less than four battery cells therein.

While the present invention has been described in detail with reference to the embodiment thereof, it would be apparent to those skilled in the art that various changes and modifications may be made therein without departing from the spirit of the present invention.

INDUSTRIAL APPLICABILITY

The present invention is available for a grinder (grinding tool), a sander (sanding machine), a nail gun, a screw driver, a tacker (staple gun), a dust extractor (cleaner), a fan, a blower, a pump, a high pressure washer, a chain saw (cutter), a gardening tool (grass trimmer, hedge trimmer), a tiller, an electric torch, and the like.

REFERENCE SIGNS LIST

10: power tool, 11: device body, 12: housing part, 13: grip part, 14: mount part, 20: terminal holder, 22: terminal rubber, 22e, 22f: projecting portion, 23: device-side terminals, 24: guide groove, 27: battery pack, 28: casing, 31: battery cells, 34: battery-side terminals, 38: guide rail, 45: guide rail, 51a: second sealing portion, 51b: third sealing portion, 60: first elastic member, 61: second elastic member

The invention claimed is:

1. An electric device body in which a battery pack is detachably mounted, the battery pack including a plurality of battery cells and a plurality of first terminals, the electric device body comprising:
   a housing, the battery pack being configured to be attached to and detached from the housing along a first direction;
   a guide mechanism provided at the housing and configured to define the first direction;
   a plurality of second terminals configured to be connected to the plurality of first terminals upon attachment of the battery pack to the housing; and
   a pressed portion configured to be elastically deformed and pressed against the battery pack in a second direction intersecting the first direction when the battery pack has been attached to the housing.

2. The electric device body as claimed in claim 1, further comprising:
   a terminal holder to which the plurality of second terminals is fixed; and
   a fixing member configured to fix the terminal holder to the housing, and
   wherein the pressed portion is provided at the fixing member.

3. The electric device body as claimed in claim 1, wherein the pressed portion is provided at the housing and disposed at a position confronting the battery pack when the battery pack has been attached to the housing.

4. The electric device body as claimed in claim 1, further comprising:
   a terminal holder to which the plurality of second terminals is fixed; and
   a fixing member configured to fix the terminal holder to the housing, and
   wherein the pressed portion comprises: a first pressed portion provided at the fixing member; and a second pressed portion provided at the housing and disposed at a position confronting the battery pack.

5. The electric device body as claimed in claim 1, wherein the housing has a first portion and a second portion along the first direction, the first portion being disposed at a position where the battery pack approaches prior to approaching the second position when the battery pack is attached to the housing, and
   wherein the pressed portion is disposed at a position closer to the second portion than to the first portion.

6. The electric device body as claimed in claim 1, wherein the pressed portion comprises a plurality of pressed portions disposed at positions different from each other along the first direction.

7. An electric device comprising:
a battery pack comprising: a plurality of battery cells; and a plurality of first terminals; and
an electric device body in which the battery pack is detachably mounted, the electric device body comprising:
- a housing, the battery pack being configured to be attached to and detached from the housing along a first direction;
- a guide mechanism provided at the housing and configured to define the first direction;
- a plurality of second terminals configured to be connected to the plurality of first terminals upon attachment of the battery pack to the housing;
- a terminal holder to which the plurality of second terminals is fixed;
- a fixing member located at a position between the terminal holder and the housing; and
- a first pressed portion provided at the fixing member, the first pressed portion being configured to be pressed against the battery pack in a second direction intersecting the first direction when the battery pack has been attached to the housing.

8. The electric device as claimed in claim 7, wherein the fixing member is configured to fix the terminal holder to the housing.

9. The electric device as claimed in claim 7, further comprising a second pressed portion provided at the housing and configured to be pressed against the battery pack in a second direction intersecting the first direction when the battery pack has been attached to the housing, housing, the second pressed portion being disposed at a position confronting the battery pack when the battery pack has been attached to the housing.

10. The electric device as claimed in claim 7, wherein the housing has a first portion and a second portion along the first direction, the first portion being disposed at a position where the battery pack approaches prior to approaching the second position when the battery pack is attached to the housing, and
wherein the first pressed portion is disposed at a position closer to the second portion than to the first portion.

11. The electric device as claimed in claim 7, wherein the first pressed portion comprises a plurality of first pressed portions disposed at positions different from each other along the first direction.

12. The electric device as claimed in claim 7, wherein the first pressed portion is configured to be elastically deformed.

13. The electric device as claimed in claim 9, wherein the second pressed portion is configured to be elastically deformed.

14. The electric device body as claimed in claim 1, wherein the housing further comprises a mount part, the mount part and the battery pack being arrayed in an array direction when the battery pack has been attached to the housing,
wherein the pressed portion comprises a first pressed portion and a second pressed portion, and
wherein the first pressed portion is provided at a position different from the second pressed portion in the array direction.

15. The electric device body as claimed in claim 14, wherein the first pressed portion is provided at a position different from the second pressed portion in the first direction.

16. The electric device body as claimed in claim 15, wherein the first pressed portion and the second pressed portion are integrally formed.

17. The electric device body as claimed in claim 16, wherein the guide mechanism includes a guide rail extending in the first direction, and
wherein the guide rail is disposed at a position between the first pressed portion and the second pressed portion in the array direction.

18. The electric device as claimed in claim 16, wherein the first pressed portion comprises two first pressed portions, the plurality of second terminals being disposed between the two first pressed portions in a direction perpendicular to both of the first direction and the second direction.

19. The electric device as claimed in claim 7, wherein the fixing member is formed of an elastic material and surrounds the terminal holder to seal a gap between the housing and the terminal holder.

* * * * *